UNITED STATES PATENT OFFICE.

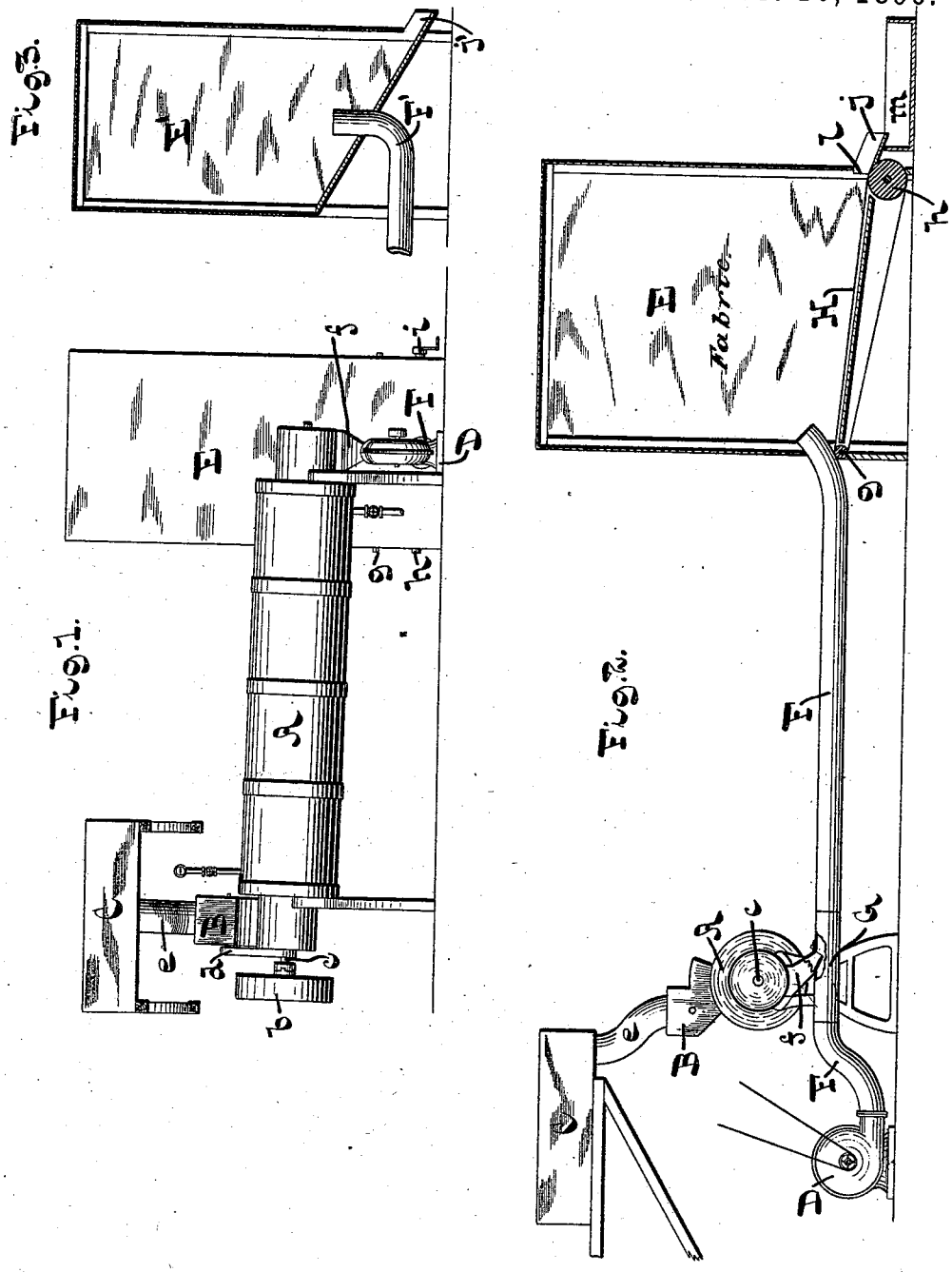

GUSTAV L. JAEGER, OF MAYWOOD, NEW JERSEY, ASSIGNOR TO THE BREWING IMPROVEMENT COMPANY, OF SAME PLACE, AND NEW YORK, N. Y.

HOP-DRIER.

SPECIFICATION forming part of Letters Patent No. 556,150, dated March 10, 1896.

Application filed July 12, 1893. Serial No. 480,267. (No model.)

*To all whom it may concern:*

Be it known that I, GUSTAV L. JAEGER, a citizen of the United States, and a resident of Maywood, in the county of Bergen and State of New Jersey, have invented certain new and useful Improvements in Apparatus for Torrefying and Cooling Hops, of which the following is a specification.

My invention has reference to improvements in the treatment of hops, and especially to an apparatus for cooling the hops after treatment in the torrefier, in which they are heated to a temperature of 212° Fahrenheit or more.

In view of the dry condition and high temperature of the material spontaneous combustion is very apt to take place when the hops are formed into bales and stored away immediately after torrefaction. To avoid this danger and also to enable the hops to be rapidly cooled in a cheap and efficient manner, I make use of an apparatus by means of which the hops are discharged directly from the torrefier into a current of atmospheric air in a suitable conducting-pipe leading to a cooling-chamber, in which latter they are discharged upwardly in a separated condition by the current and gradually fall to the bottom of the chamber. The hops by this method are brought into intimate contact with the air, with a resultant rapid transfer of heat, especially during their fall in the cooling-chamber.

The nature of my invention will best be understood when described in connection with the accompanying drawings, in which—

Figure 1 represents a side elevation. Fig. 2 is an end elevation, partly in section. Fig. 3 is a sectional elevation of a modified form for the cooling-chamber.

Similar letters of reference designate corresponding parts throughout the several views of the drawings.

In the drawings, the letter A designates a torrefier of any suitable construction in which the hops can be heated to a temperature of 212° Fahrenheit or more. Preferably I use the torrefier shown in United States Patent No. 514,265, granted to me February 6, 1894. *a* is the steam-jacket, and *b* the driving-pulley for rotating the shaft *c* of the agitator.

B is the hopper located at the inlet-opening of the torrefier, which hopper may be provided with means for crushing or comminuting the hops, the same being driven by the chain or belt *d*. Above the hopper is located a bin C for feeding fresh hops to the same through the chute or pipe *e*.

D is a blower or other device for creating a current of air, E is the cooling-chamber, and F is a pipe leading from the blower to the cooling-chamber. In the pipe F is disposed an ejector G, the pipe *f* of which is placed in connection with the discharge-opening of the torrefier. In practice I form this ejector by simply leading a nozzle or spout *f* from the discharge-opening into the pipe F, the same entering more or less in the direction of the air-current in the pipe F. The cooling-chamber is preferably made of a skeleton frame, with walls of muslin, canvas, or foraminous material, so as to permit the escape of the air under pressure. For facilitating the removal from time to time of the accumulating hops the chamber is provided with an inclined endless discharge-apron H, located at its bottom and completely covering the same. The apron extends around guide-rollers *g h*, located at opposite ends of the chamber, one of the same having attached thereto a suitable crank *i*, Fig. 1, for rotating it. The apron, when actuated, conducts the material to the spout *j*, disposed at the discharge-opening *l* and leading to a suitable bin *m*, in which the hops are collected when discharged.

For obtaining a continuous discharge slow continuous motion may be imparted to the endless apron H. The end of the pipe F in this example enters the cooling-chamber laterally and is turned upwardly to throw the mixed air and hops in a diagonal line across the chamber.

In Fig. 3 I have shown a cooling-chamber E' constructed without the feed-apron. The delivery-pipe F' is made to enter the same from the bottom and directed to discharge upwardly. The chamber is provided with an inclined bottom and one or more discharge-spouts *j*.

In general the cooling-chamber may be of any other construction suitable for the purpose, either with open or solid walls. In the latter case any usual means may be employed for conducting away the air.

The hops, torrefied in the usual manner in the apparatus, are fed continuously toward the lower end of the same and are discharged through the spout $f$ into the current of air produced by the blower and into the pipe F. The mixed air and hops are discharged upwardly into the cooling-chamber E, and then gradually fall through the current of air to the bottom of the chamber, thus being brought into intimate contact with the air, with a resultant rapid transfer of heat to the air.

I have found in practice that atmospheric air at the prevailing temperature without artificial cooling will answer for reducing the temperature of the hops to a degree permitting the same to be stored away with perfect safety.

While I have herein described my invention as applied to hops, it is evident that it may be similarly applied for the purpose of cooling brewers' grain and other cereal or vegetable matter which has been heated, dried, or torrefied.

What I claim as new, and desire to secure by Letters Patent, is—

1. The combination with a torrefier, of a cooling-chamber made of foraminous material permitting passage of air and provided with a discharge-opening at or near its bottom, an air-pipe discharging upwardly into said chamber, a blower connected with said air-pipe, and a spout leading from the discharge end of the torrefier into the air-pipe between the blower and the cooling-chamber, substantially as described.

2. The combination with a torrefier, of a cooling-chamber made of foraminous material as described, a traveling discharge-apron at the bottom of the cooling-chamber, an air-pipe discharging upwardly into said chamber, a blower connected with said air-pipe, and a spout at the discharge end of the torrefier opening laterally into said air-pipe, substantially as described.

In testimony that I claim the foregoing as my invention I have signed my name, in presence of two witnesses, this 30th day of June, 1893.

GUSTAV L. JAEGER.

Witnesses:
CHARLES H. FRINGS,
EDWD. PATTERSON.